Sept. 20, 1938.     L. J. R. HOLST ET AL     2,130,347
LENS SYSTEM
Filed Sept. 22, 1934     2 Sheets-Sheet 1
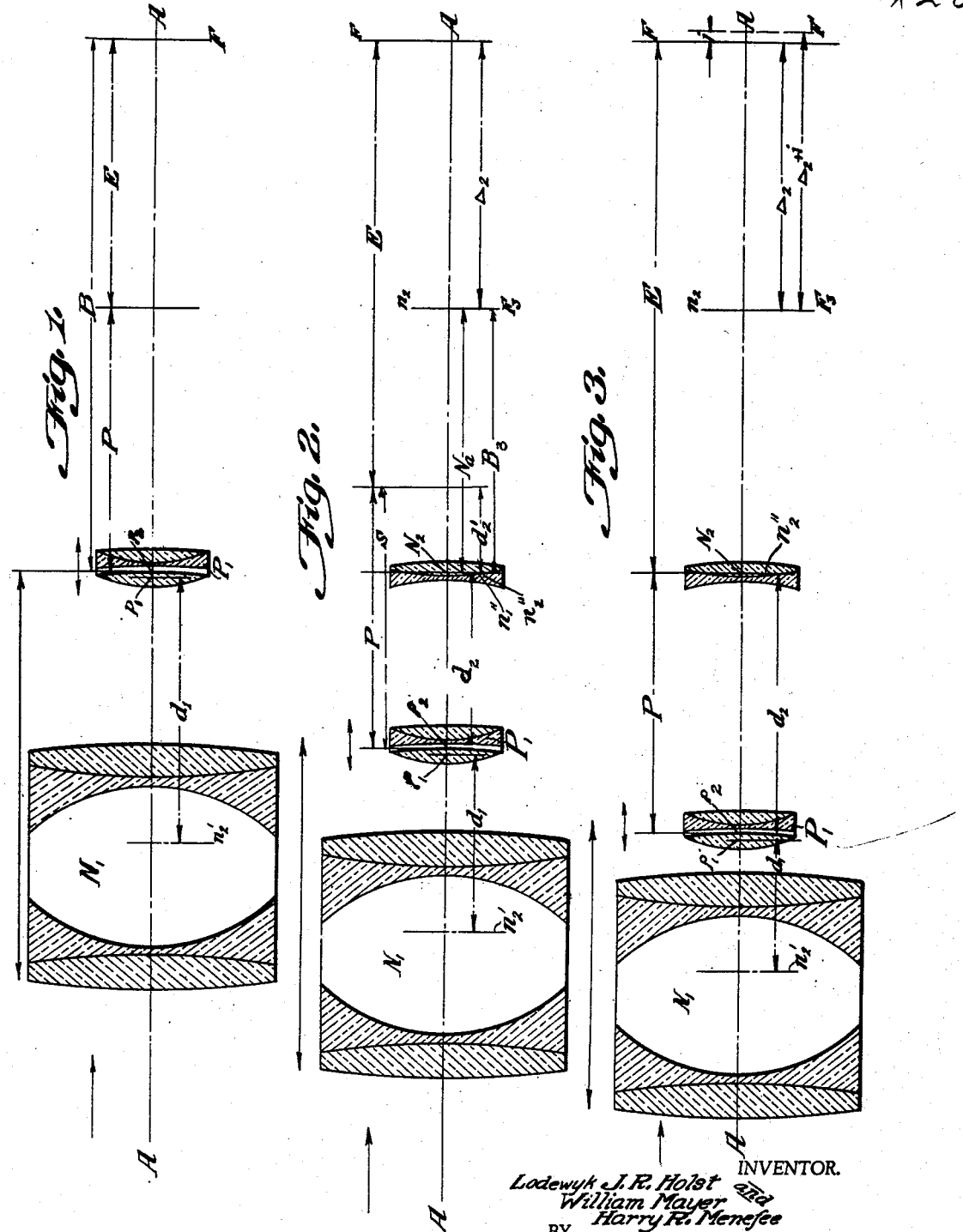
INVENTOR.
Lodewyk J. R. Holst and
William Mayer
Harry R. Menefee
BY
ATTORNEY.

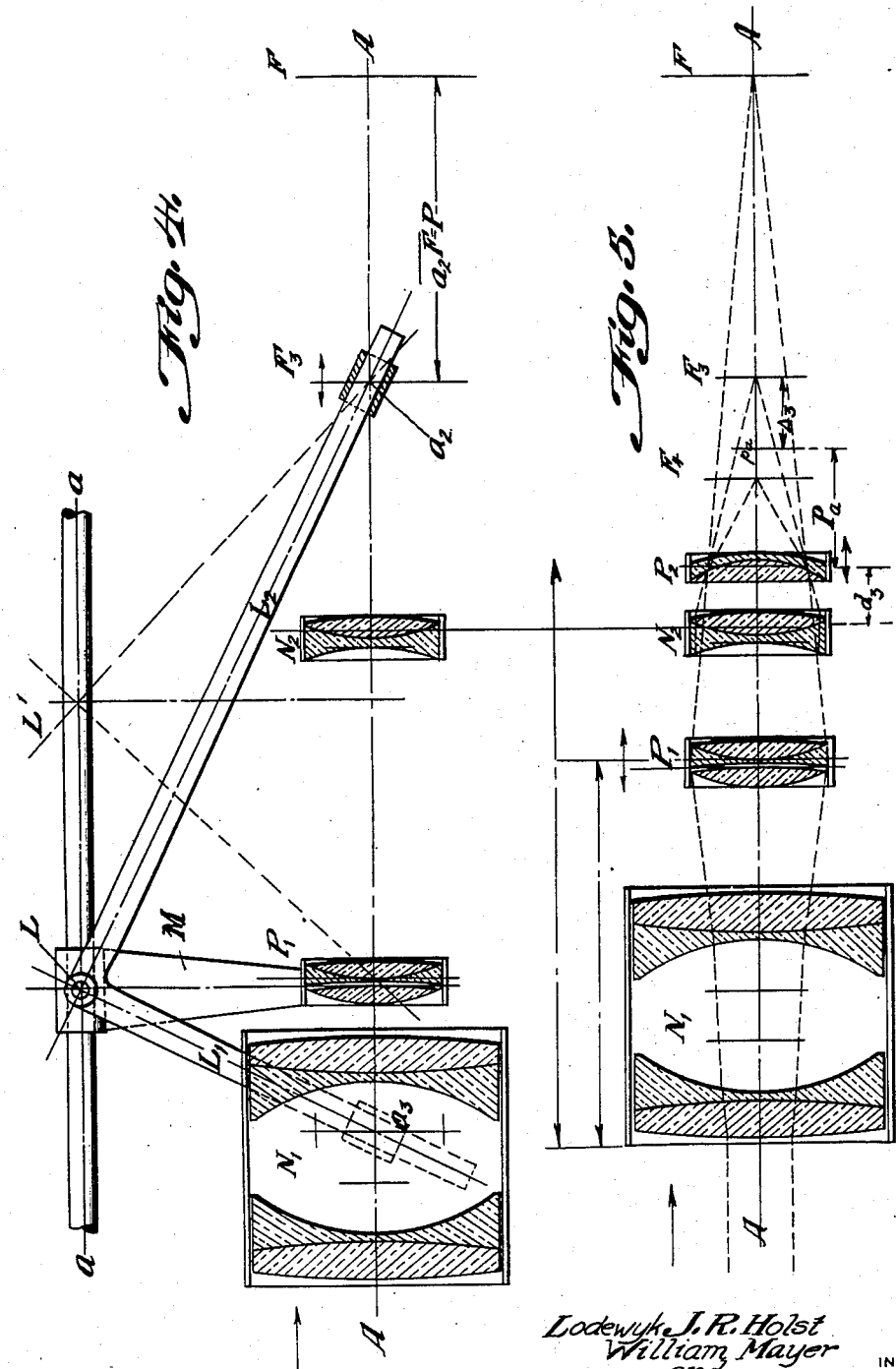

Patented Sept. 20, 1938

2,130,347

UNITED STATES PATENT OFFICE 2,130,347

LENS SYSTEM

Lodewyk J. R. Holst, Brookline, Pa., and William Mayer, Larchmont, and Harry R. Menefee, Bronxville, N. Y., assignors to C-Lens Corporation, New York, N. Y., a corporation of New York Application September 22, 1934, Serial No. 745,144

11 Claims. (Cl. 88—57)

Our invention is a lens system in which the focal lengths and relative positions of the constituents or lens units are so related as to produce optical results hitherto unattainable.

In high speed photographic work, such as the taking of motion pictures, it is necessary to secure the greatest possible illumination entailing the use of a large lens opening, and it has hitherto been deemed axiomatic that it is not possible in such work to secure perfect definition of all objects in the field, but only possible to secure perfect definition of the portion containing the greatest interest, and the faster the lens or lens system, the larger its aperture, and the longer its focal length the greater has been the loss in depth of focus. Hence the modern very fast positive lens structures working with apertures of f/1, more or less, have found only a very limited use in practice, due to the critical accuracy with which they must be focused, and almost absolute lack of depth of focus. Moreover, the taking of close-ups by the so-called "zooming" lenses has been found very difficult due to the variation in the back focal length of the "zoom" lens system with every variation in the equivalent focal length thereof to produce a change in the size of the image of the predominant object and inevitable blurring of all other objects in the close foreground or remote background.

We have discovered that by the association, in a lens system, of front and rear lens units or constituents of negative focal length with an intermediate lens unit or constituent of positive focal length so that the equivalent focal length of the three principal constituents together equals the equivalent focal length of a complementary pair of such constituents alone multiplied by a fraction having as its numerator the focal length of the third element alone and as its denominator the optical interval between the focal plane of the complementary pair alone and the rear focal point of the third constituent, we have produced a lens system by which there is attainable great depth of focus with wide aperture with the system adjusted for a long equivalent focal length and having widely variable equivalent focal lengths without varying the back focal distance of the systems. Such system, when adjusted for short equivalent focal lengths, gives a very marked improvement in perspective, atmosphere and roundness, as well as improved depth of focus.

We have found that by so relating the constituent lenses in such positions that the back focal length of the triple system is equal to the focal length of the back lens alone, hair-line sharp images are produced of all objects in the field positioned between infinity and the front focal point of the system, and reasonable variations from this condition diminish but slightly the sharpness of the images. The system has, therefore, a capacity for a true unlimited depth of focus, which is believed to be an entirely new and novel result.

Moreover, by making the constituents of the complementary pair above referred to numerically of the same focal lengths, the constituents comprised in the complementary pair may be adjusted relatively to one another and to the third constituent by a simple mechanical movement to vary the equivalent focal length of the system easily, quickly and at a uniform rate and without varying the back focal distance, and similar results are attainable by a somewhat more complex mechanism when using lens units of different focal lengths as the complementary pair.

In a preferred embodiment of our invention, a lens unit or constituent of positive focal length, and working with a stop of low f number or wide aperture, is positioned between two constituents or lens units each of negative focal length and placed at such distances along the optical axis common to the lens units that the distance between the focal point resulting from the cooperation of the two outer constituents (viz., the collective constituent of negative focal length and the intermediate constituent of positive focal length) and the focal point of the third constituent of negative focal length, equals the difference between the focal length resulting from the combination of the first two constituents and the distance between the second and third constituents, such distance being measured from the second nodal point of the positive constituent to the first nodal point of the negative third constituent. By simultaneous displacements of the first two constituents relatively to one another and in accord with their respective motions relative to the third constituent (which remains in fixed relation to the focal plane of the system) the equivalent focal length of the system is variable without changing the back focal distance of the system, which is maintained constant by the action of the third constituent.

The back focal distance may be further shortened and greater illumination of the image secured while maintaining all the advantages of the system, by inserting a further constituent or lens unit of positive focal length behind the system, thereby securing a very short fixed back focal distance for the quadruple system for varying object distances. The complementary pair, consisting of the collective negative constituent and intermediate positive constituent, may be adjusted as before, after the insertion of the auxiliary positive constituent, to modify the equivalent focal length of the system and vary the size and intensity of the illumination of the image while maintaining an unvarying back focal distance, which, however, differs from the back focal distance of the three constituent system alone.

The characteristic features and advantages of our invention will further appear from the following detailed explanation thereof in conjunction with the accompanying drawings, in which Fig. 1 illustrates diagrammatically an assembly of lens units forming a species of inverted telephoto system and shown to assist in an understanding of the principles underlying our invention; Fig. 2 illustrates diagrammatically a lens system embodying our invention; Fig. 3 illustrates diagrammatically the lens system shown in Fig. 2 with the constituents positioned to produce a different equivalent focal length for the system while maintaining the same back focal distance for the system; Fig. 4 illustrates diagrammatically the system shown in Fig. 3 having the constituents thereof connected with a simple mechanical device for effecting the "zooming" of the lens units for the purpose of taking close-ups; and Fig. 5 illustrates diagrammatically our improved lens system having its back focal length further shortened by the insertion of an auxiliary positive lens unit or constituent.

In the particular embodiment of our invention which we have illustrated diagrammatically in Figs. 1 to 4 inclusive, we use an outer lens unit or constituent $N_1$ of negative focal length N, an intermediate lens unit or constituent $P_1$ of positive focal length P, and a rear lens unit or constituent $N_2$ of negative focal length $N_a$. These constituents $N_1$, $P_1$ and $N_2$ are mounted to permit their axial movements along a common axis A—A, normal to a fixed focal plane F, such as the film plane of a motion picture camera or projector. The lens units or constituents may be of any suitable type, for instance, the lens unit $N_1$ may be in the form of an achromatic meniscus doublet, the constituent $P_1$ may be an achromatic meniscus triplet, and the constituent $N_2$ may be an achromatic doublet having its concave surface toward the convex surface of the constituent $P_1$.

If the negative lens unit $N_1$ and positive lens unit $P_1$ be assembled as a complementary pair with the second nodal point $n'_2$ of the lens unit $N_1$ a distance, which may be designated $d_1$, in front of the first nodal point $p_1$ of the positive lens unit $P_1$, the combined lens units will have an equivalent focal length which may be designated E. To sharply focus images resulting from the passage of image rays through the lens units $N_1$ and $P_1$ from left to right (Fig. 1) on the focal plane F, the second nodal point $p_2$ of the positive lens unit $P_1$ must be positioned in front of the focal plane F a distance, which may be designated B, and which is the back focal length, equal to the sum of the equivalent focal length E of the complementary lenses and the shift of the second nodal point of the lens combination from the second nodal point of the positive lens unit $P_1$. When the focal lengths of the lens units $N_1$ and $P_1$ are numerically equal this shift of the nodal point will be equal to the focal length of the positive lens unit $P_1$ and hence may, for convenience, be designated P. When the focal lengths of the lens units $N_1$ and $P_1$ are numerically unequal, the shift of the second nodal point of the combination from the second nodal point of the positive lens unit $P_1$ will vary with every variation in the equivalent focal length of the combination, and in such cases the shift may be conveniently designated S. It will therefore be seen that every change in the distance $d_1$ involves a corresponding change in the equivalent focal length of the combination and a change in the shift S of the nodal point, unless the focal length of the lens unit $N_1$ equals the focal length of the lens unit $P_1$, in which latter case the shift S is constant and equal to P. But in any case a change in the distance $d_1$ involves a corresponding change in the back focal distance, which is measured from the rear surface of the lens unit $P_1$ to the focal plane F.

These conclusions follow from the application to the diagrammatic lens set-up shown in Fig. 1 of known principles, viz., The equivalent focal length (conventionally designated E) of any two spaced lenses of opposite focal sign (whose individual focal lengths are conventionally designated P and —N) is equal to the quotient resulting from dividing the product of the focal lengths of the two lenses by the distance between their adjacent principal focal points, commonly designated delta ($\Delta$) in optical computations. When the complementary lens consists of a negative lens and a positive lens of usual form, such distance $\Delta$ is most conveniently determined by subtracting from the focal length of the positive lens (viz., P) the sum of the focal length of the negative lens plus the distance (conventionally designated $d_1$) between the second nodal point of the first lens and the first nodal point of the second lens. The combination of the complementary lenses will be of positive focal length, i. e., form an objective, when the sign of the dividend and of the divisor are the same. Expressed algebraically and giving effect to the fact that the focal length of the lens unit $N_1$ is negative—

$$E = \frac{-NP}{P - N - d_1} = \frac{-NP}{-\Delta}$$

The back focal length (conventionally designated B) of any two spaced lenses is equal to the quotient resulting from dividing the product of the focal length of the second lens (in the above instance designated P) and the focal length of the first lens (in the above instance designated —N) less the distance between them, measured as before, by the same divisor, delta ($\Delta$) (viz., $P - N - d_1$). Algebraically expressed $-\Delta$ $$B = \frac{P(-N-d_1)}{P - N - d_1} = \frac{-PN - Pd_1}{-\Delta}$$

If the focal length of the lens unit $N_1$ and the focal length of the lens unit $P_1$ are made numerically equal, it will be obvious that $\Delta$ will equal $d_1$.

Since $$B = \frac{-PN - Pd}{-\Delta}$$

and since $$E = \frac{-NP}{-\Delta}$$

the shift of the second nodal point of the lens combination from the second nodal point of the rear lens element will be $$B-E=\frac{-PN-Pd_1}{-\Delta}-\frac{-NP}{-\Delta}=\frac{-PN-Pd_1+NP}{-\Delta}=\frac{-Pd_1}{-\Delta}$$

and since $d_1$ and $\Delta$ are equal, it follows that $B=E+P$ whenever the focal lengths of the lenses are equal and since the shift equals $B-E$ and the shift is found to equal $P$, then by mere transposition $B$ equals $E+P$.

It may be noted that in the above equations, $(-N-d)$ is numerically greater than $-N$ alone, hence the back focal length and the back focal distance will both always exceed the equivalent focal length, and as $-N$ and $P$ are constants for any given case, it follows the changes in $d_1$ will cause changes in both the equivalent focal length $E$ and the back focal length $B$.

To overcome the obvious disadvantages of the variability in the back focal distance with changes in the equivalent focal length, as well as to secure the depth of focus and other advantages hereinbefore referred to, in accordance with our invention there is inserted a lens unit $N_2$ between the lens unit $P_1$ and the focal plane $F$, as illustrated in Figure 2, to introduce a shift of the second nodal point of the triple combination contra to and preferably equal to changes in the equivalent focal length of the triple system.

In Figure 2, the distance $d_1$ is shorter numerically than the distance $d_1$ in Figure 1, but it nevertheless is still true that for the lens combination $N_1 P_1$ alone their equivalent focal length is still $E$ and the back focal length of that combination is still $E+S$, and when the focal lengths of the lens units $N_1$ and $P_1$ are equal, then the back focal length of such combination is equal to $E+P$, and the second nodal point of the front lens combination will be at the distance $P$ from the second nodal point of the positive lens unit $P_1$. This location of the second nodal point of the front combination results from the fact that the second nodal point of a lens combination is positioned behind the second nodal point of the second lens of the combination a distance equal to the quotient resulting from dividing the product of the focal length of the second lens and the distance between the first and second lenses by the sum of the focal lengths of the first and second lenses minus the distance between the lenses. Algebraically expressed—

$$S=\frac{Pd_1}{P-N-d_1}$$

and when $P$ and $N$ are equal $S=P$.

The negative lens unit $N_2$ has a principal focal point $n_a$ between the rear surface of the lens $N_2$ and the principal focal plane $F$ of the complementary lenses $N_1$ and $P_1$. The distance between the focal point $n_2$ and the focal plane $F$ may be designated $\Delta_2$ in analogy to the use of $\Delta$ for designating the corresponding distance between the focal points of the lenses $N_1$ and $P_1$ in considering Figure 1.

The lens unit $P_1$ considered alone is a lens of unvarying focal length but by the association with the lens $P_1$ of the lens $N_1$ and variable distances $d_1$ we may consider that the lens $P_1$ has had imparted thereto a variability of focal length $E$ dependent upon the distance $d_1$.

We may now consider that the positive lens unit $P_1$ (to which variability of focal length has been imparted by the influence of the lens unit $N_1$ and the variable distance $d_1$) acts as the first and positive constituent of a direct telephoto system of which the lens unit $N_2$ is the second and negative constituent. The distance, optically considered, between the positive lens $P_1$ and the negative lens $N_2$ is then measured by the separation between the second nodal point $p_2$ of the lens unit $P_1$ and the first nodal point $n''_1$ of the lens unit $N_2$, and such distance may be designated as $d_2$ in analogy to $d_1$, as the distance $d_2$ has a corresponding function, with relation to the lens units $P_1$ and $N_2$, to the function of $d_1$ with relation to the lens units $N_1$ and $P_1$. The first nodal point $n''_1$ and the second nodal point $n''_2$ of the lens unit $N_2$ are preferably coincident, but any opening between such nodal points is constant and in practical lenses so small as to be negligible in effect in our system.

The focal length $N_a$ of the negative constituent $N_2$ of this direct telephoto system is measured from the second nodal point $n''_2$ of the lens unit $N_2$ to the focal point $n_a$ of the lens unit $N_2$, and the distance between the focal point $n_a$ and the focal point of the complementary pair of lenses $N_1 P_1$ alone in the focal plane $F$ thereof, represents the optical interval of the direct telephoto system and may thus be designated by $\Delta_2$.

The second nodal point of the direct telephoto system is an intangible point which recedes from the focal plane $F$ as the value of $E$ increases due to the movements of the lens elements $N_1 P_1$ and may be made to recede at the same rate at which $E$ increases by making the lens unit $N_1$ of the same focal length as the lens unit $P_1$ so that $S$ equals $P$. Under the latter conditions the back focal length $B_3$ and the back focal plane $F_3$ of the triple system, measured from the second nodal point $n''_2$ do not vary, and when $S$ and $P$ differ, within reasonable limits, the variability of $B_3$ and $F_3$ is negligible.

The formulas above given are applicable to the direct telephoto system and the determination of the equivalent focal length thereof, which may be designated $E_3$, and the back focal length thereof which may be designated $B_3$. Applying these formulas and substituting the appropriate values in the layout shown in Fig. 2—

$$E_3=\frac{-EN_2}{E-N_2-d_2}=E\left(\frac{-N_2}{-\Delta_2}\right)$$

$$B_3=\frac{-N_2(E-d_2)}{E-N_2-d_2}=N_2\left(\frac{E-d_2}{-\Delta_2}\right)$$

This shows that the equivalent focal length $E_3$ of the system containing the three lens elements $N_1 P_1 N_2$ is equal to the equivalent focal length $E$ of the complementary pair $N_1 P_1$ multiplied by the fraction $$\frac{N_2}{\Delta_2}$$

and consequently such equivalent focal length $E_3$ varies proportionately with $E$ and inversely with $\Delta_2$. Since $$E_3=E\left(\frac{N_2}{\Delta_2}\right)$$

it follows from solving this equation for $N_2$ that $$N_2=\Delta_2\left(\frac{E_3}{E}\right)$$

and hence the focal length of the lens $N_2$ should equal the equivalent focal length of the triple system divided by the equivalent focal length of the duplex system and multiplied by the optical interval between the two systems. Similarly by solving the equation for $\Delta_2$ we find that the optical interval between the systems should equal the equivalent focal length of the duplex system divided by the equivalent focal length of the triple system and multiplied by the focal length of the rear element for $$\Delta_2 = N_2 \left( \frac{E}{E_3} \right)$$

From a consideration of Figure 2, it will be seen that the distance $d_2$ between the second nodal point $p_2$ of the lens $P_1$ and the second nodal point $n'_2$ of the lens $N_2$ equals $P + E - (N_a + \Delta_2)$. In this expression all the symbols excepting E stand for constants, and hence the value of $d_2$ varies when and as E varies, and the value $(E - d_2)$ will remain constant through all adjustments of the set-up.

Since, as previously pointed out, $$B_3 = N_2 \left( \frac{E - d_2}{-\Delta_2} \right)$$

and since $(E - d_2)$ is a constant, the value of $-\Delta_2$ may be made equal to the value of $(E - d_2)$ so that $$\frac{E - d_2}{-\Delta_2} = 1$$

and $B_3 = N_2$, when the back focal length $B_3$ is made equal to the focal length $N_2$. With such an arrangement, hair-line sharp images will be made of objects within a focal depth from infinity to the principal focal point in front of the lens system, and when the quotient of $$\frac{E - d_2}{-\Delta_2}$$

is greater or less than 1 but slight diminution of sharpness results throughout the same focal range.

It will thus be seen that the equivalent focal length of the three lens combination may be varied by varying the adjustments of the two outer constituents $N_1$ $P_1$ with relation to each other and to the stationary equivalent focal plane F of such outer constituents without in any way changing the back focal length $B_3$ and the resulting back focal plane $F_3$ of the complete system with reference to the lens unit $N_2$.

But not only is the focal plane $F_3$ maintained constant throughout variations in the equivalent focal length of the system, but such focal plane $F_3$ is maintained constant notwithstanding variations in the object distance and the consequent variations in the conjugate back focal lengths of the front combination of complementary units $N_1$ $P_1$, as will appear from the following explanation and the diagrammatic showing of Fig. 3.

With our lens system adjusted to any desired equivalent focal length, reductions in the object distance affects the conjugate back focal length of the two front components $N_1$ $P_1$, i. e., B, as in an ordinary lens system. For convenience, the object distance may be expressed in units of the equivalent focal length E, as the increments of the back focal distance is then E divided by the number of units of object distance. For instance, if the object distance is fifty times E, then B will be increased a distance equal to $$\frac{E}{50}$$

As a direct result of the position of the object at a distance of 50E, the focal plane F of the two components has been displaced rearwardly by an increment, which may be designated $i$, and which, in the instance given, will be equal to $$\frac{E}{50}$$

The value of $\Delta_2$ is also augmented by the same increment $i$, so that the back focal length of the triple system becomes—

$$B_3 = -Na \left( \frac{(E - d_2 + i)}{-(\Delta_2 + i)} \right)$$

and consequently when $\Delta_2$ is equal to $(E - d_2)$, there is no change whatever in the back focal length of the triple system, and when $\Delta_2$ differs from $(E - d_2)$, within reasonable limits, the variation in $B_3$ is so slight as to be negligible.

When our lens system is used to form images of objects at different distances, particularly where one of such objects is in the close foreground, the perspective of the resulting image is improved and approaches true proportions of the respective objects. The explanation of this phenomenon resides in the fact that, as already shown, the equivalent focal length $E_3$ of the triple system equals $$E \left( \frac{N_2}{\Delta_2} \right)$$

and that the increase $i$ of the back focal distance B of the complementary constitutents $N_1$ $P_1$, on account of a reduced object distance, increases the value of $\Delta_2$ by the same increment $i$, as set forth in connection with Fig. 3. When, as a result of decreased object distance, $\Delta_2$ has grown to be $\Delta_2 + i$, then the quotient of the fraction $$\frac{N_2}{(\Delta_2 + i)}$$

has numerically decreased and hence—

$$E_3 = E \cdot \left( \frac{N_2}{\Delta_2 + i} \right)$$

which is less than $$E \cdot \left( \frac{N_2}{\Delta_2} \right)$$

The value of $E_3$ constantly diminishes as the object distance is diminished and as the increment $i$ is consequently increased, whereas with usual type of lenses or lens systems exactly the reverse takes place. Consequently with our system close foreground objects are no longer depicted on abnormally large scales as compared with the scales of more remote objects and the images show improved perspective.

A numerical example will further elucidate this improvement in perspective. Let it be assumed that objects are placed respectively at six feet and at three feet from the principal front focal point of the lens system shown in Fig. 3, and that each of the lens units has a focal length of three inches and the system is adjusted so E equals three inches and that the infinity focus $E_3$ of the whole system is also three inches and the distance $\Delta_2$ is also three inches. In such case, the object at six feet distance is twenty-four times the focal length away from the front focal point of the lens. Hence the back focal length of the two front components $N_1$ $P_1$ is increased by $\frac{3}{24}$ or .125 of an inch. As explained, $\Delta_2$ is also increased by the increment .125 of an inch and is now 3.125 inches. Consequently—

$$E_3 = \frac{3 \times 3}{3.125} = 2.88$$

The nearer object is but twelve times three inches away from the front focal point of the lens and hence the back focal length of the lens combination $N_1 P_1$ is increased for this object by an increment of $3/12$ or .25 of an inch. For this object $\Delta_2$ is now 3.25 inches, so that for the nearer object $$E_3 = \frac{3 \times 3}{3.25}$$

or 2.769 inches. The back focal length $B_3$ for both objects remains three inches. The scale of reproduction is thus for the front object 72/2.88 or, say, 21.527 and the scale of reproduction for the rear object is 36/2.77 or, say, 13. This results in a ratio of $$\frac{21.527}{13}$$

or 1.655 in the size of the images of the two objects as depicted by our system, as compared to a ratio of 2 resulting from the use of a usual type lens of three inch equivalent focus.

If now, the object distance be shortened so that the object is but three inches in front of a usual type lens of three inch equivalent focus, i. e., in its front focal plane, no image whatever of such object will be formed by such usual type lens because the conjugate focal plane of the object lies in infinity. If, however, the object distance of an object be shortened so that the object is in coincidence with the front focal plane of the triple lens system adjusted for three inch equivalent focus $E_3$, then an image will be formed at the focal plane $F_3$ because with our lens system both the dividend and the divisor of the fraction $$\frac{E - d_2}{\Delta_2}$$

have become infinity so that infinity divided by infinity remains one, the back focal length $B_3$ has not been changed and is still $N_2 \times (1)$ or three inches.

This unlimited depth of focus or definition is in no way dependent on the value of the relative opening with which the combination works, and hence our invention is applicable to the construction of lenses having a maximum aperture or f value, which need be limited only by the spherical aberration and other factors affecting definition.

Consequently our lenses are available for use at wide open apertures where all other lenses of equivalent focal length would have to be stopped down to such a small aperture as to pass insufficient light for photography, particularly for motion picture photography.

For instance, in taking motion pictures, the maximum diameter of the circles of confusion should not exceed $1/200$ of an inch. The hyperfocal distance is the minimum distance of objects from the lens which will give images of requisite sharpness when the lens is focused for infinity and then stopped down to the stated relative opening, of which $r$ is the number, as for example $f/r$. When a lens is focused on an object at a distance D, the distance of the nearest objects of which sharp images will be produced is determinable by dividing the product of the hyperfocal distance and the distance D by the sum of the hyperfocal distance and the distance D, and the distance of the most remote object of which a sharp image will be formed is determinable by dividing the product of the hyperfocal distance and the distance D by the difference between the hyperfocal distance and the distance D. Algebraically expressed—

$$D \text{ minimum} = \frac{H \cdot D}{H + D}$$

and $$D \text{ maximum} = \frac{HD}{H - D}$$

If an ordinary well corrected lens of six inch equivalent focus be set at an aperture f/4.6, and if the permissible diameter of the circles of confusion is $1/200$ of an inch, then the hyperfocal distance of such lens will be—

$$H = \frac{200 f^2}{r} = \frac{200 \times 36}{4.6} = 1566 \text{ inches}$$

If such a lens be focused on an object at a distance of 200 inches, the minimum distance at which objects will have the requisite sharpness will be 177 inches and the maximum distance of an object forming an image of requisite sharpness will be 229 inches, giving a depth of field of only 52 inches. This follows from the application of the above formulæ—

$$D \text{ minimum} = \frac{H \cdot D}{H + D} = \frac{1566 \times 200}{1566 + 200} = 177 \text{ inches}$$

minimum object distance.

$$D \text{ maximum} = \frac{H \cdot D}{H - D} = \frac{1566 \times 200}{1566 - 200} = 229 \text{ inches}$$

maximum object distance.

If such lens be stopped down to give the requisite definition to images of objects at 150 inches and 300 inches from the lens, the aperture will necessarily be f/12, which is entirely too small for use in moving pictures or other uses where speed is requisite and is likewise unsuitable for use indoors and only available for use under favorable conditions out of doors.

This short range of field explains the deplorable falling off of foreground and background definition in motion picture close-ups photographed with even the best of the previous lenses and which close-ups frequently demand wider distance limits than those suggested.

When using our triple lens system with a positive constituent of three inch focus working at the opening of f/2.3 at infinity, and setting the system lens units to produce a six inch equivalent focus $E_3$, the actual speed of the triple system is f/4.6. When such triple system is focused on an object at 200 inches distance, all objects from infinity to the front focal plane will form sharp images, for as above shown its range is from infinity to its front focal plane.

From the foregoing description it is apparent that the minimum equivalent focal length $E_3$ to which the triple lens system can be adjusted depends upon mechanical conditions limiting the minimum value to which $d_2$ can be reduced, with a possible ultimate reduction of the value of $d_2$ to zero.

If, however, it is desirable to further decrease the equivalent focal length of our system beyond that attainable by the reduction of $d_2$ to zero, this may be effected (as shown in Fig. 5) by the insertion of a lens unit $P_2$ of positive focal length between the lens unit $N_2$ and the focal plane $F_3$. This insertion of the lens $P_2$ also increases the illumination of the image.

Since, as before shown, the triple combination $N_1$, $P_1$, $N_2$ has an unvarying back focal length $B_3$ when the fraction $$\frac{N_2}{\Delta_2}$$

equals 1, and a substantially unvarying back focal length $B_3$ under other conditions within reason, it follows that the triple system may be regarded as having (notwithstanding actual variations in its equivalent focal length $E_3$), an equivalent focal length equal or substantially equal to $B_3$ insofar as affects the relationship between the positive lens $P_2$ and the triple system. The quadruple system $N_1$, $P_1$, $N_2$, $P_2$ will therefore have a combined equivalent focal length, which may be designated $E_4$ and determined from the equation—

$$E_4 = \frac{B_3 \times P_a}{B_3 + P_a - d_3}$$

Since all the factors in determining $E_4$ are constants, $E_4$ will also be a constant. The back focal length $B_4$ of the quadruple combination will also be a constant because the back focal length of two spaced lenses each of positive focal length and constant back focal length is determinable from the equation—

$$B_4 = P_a \frac{(B_3 - d_3)}{P_a + B_3 - d_3}$$

In this formula $d_3$ is the distance between the second nodal point of the lens unit $N_2$ and the front nodal point of the lens unit $P_2$ and it is a constant, and all the other factors in the equation are constants, as heretofore explained.

Since the equivalent focal length of any combination of positive lenses is less than the focal length of either lens alone, the back focal distance $B_4$ of the quadruple combination will be less than $B_3$, and the focal plane of the quadruple combination will lie in a plane, which may be designated $F_4$. Consequently, after the introduction of the constituent $P_2$ behind our triple system, the focal plane $F_3$ will have to be shifted to $F_4$ to secure a sharp focus or the quadruple system may displaced as a unit to make the focal plane $F_4$ coincident with the actual position of the plane $F_3$ when the film or other image surface is to be maintained coincident with the plane $F_3$.

It will, of course, be understood that a desired ultimate back focal length $B_4$ may be attained by suitably spacing $P_2$ from $N_2$, and when the desired back focal length has been selected these units are fixed relatively to the desired image plane. The lens units $N_1$ and $P_1$ may then be moved relatively to one another and to their focal plane F to vary the equivalent focal length of the quadruple system without varying the back focal length thereof.

As a numerical illustration of the effect of the insertion of a supplementary positive lens behind our triple system, it may be assumed that the lens unit $P_2$ has a focal length of two inches and is spaced .25 of an inch behind the lens $N_2$ of a triple combination in which the elements $N_1$ $P_1$ and $N_2$ are each of three inch focal length and which are so positioned as to produce a back focal length $B_3$ of three inches and an equivalent focal length of three inches. As a result of the insertion of the lens unit $P_2$, the equivalent focal length of the quadruple system becomes 1.263 for—

$$E_4 = \frac{2 \times 3}{3 + 2 - .25} = 1.263$$

The back focal length of the quadruple combination, measured from the second nodal point of the lens unit $P_2$, is 1.155 for—

$$B_4 = \frac{2(3 - .25)}{3 + 2 - .25} = 1.155$$

As illustrated in Fig. 5, a beam of light approaching the lens system from infinity enters the first lens $N_1$ and is thereby spread to the diameter of the lens unit $P_1$. The lens unit $P_1$ converges the beam so that its outer rays are converged toward a point at the intersection of the focal axis A—A with the focal plane F. The interposition of the lens units $N_2$ and $P_2$, however, prevents the actual convergence of the rays to such point. On entering the lens unit $N_2$, the beam is dispersed but on emerging from the lens unit $N_2$ it converges toward the optical axis A—A in the focal plane $F_3$. Traveling this direction, the beam finally passes through the lens unit $P_2$ where it is again converged toward a final focus in the optical axis at the focal plane $F_4$.

While the settings of the lens units may be effected manually, it is desirable, particularly in motion picture photography, that the lens units $N_1$ $P_1$ be variable mechanically to one another and to their focal plane so as to maintain at all times their proper relative relationships, and permit rapid change of the equivalent focal lengths. We have illustrated diagrammatically in Fig. 4 a simple mechanism for this purpose.

As illustrated in Fig. 4, a slide-way $a$—$a$ having its axis parallel with the optical axis A—A, has sleeved thereon a slidable mounting M in which the lens unit $P_1$ is fixed normal to the optical axis A—A.

A rectangular lever L is pivoted on the mounting M with its axis at the intersection of the axis of the slideway $a$—$a$ and a perpendicular to such axis $a$—$a$ passing through the first nodal point of the lens unit $P_1$.

The lever arm $L_1$ of the lever L is rectilineally slidable through a sleeve $a_3$ which is pivotally mounted on the casing of the lens $N_1$ with its axis at the intersection of the optical axis A—A and a perpendicular thereto passing through the second nodal point of the lens $N_1$.

The lever arm $L_2$ is slidable rectilineally through a sleeve $a_2$ which is pivotally mounted with its axis at the intersection of the optical axis A—A and a projection of the focal plane $F_3$.

To decrease the focal length of the system from that shown in Fig. 4, it is necessary that the lens $N_1$ $P_1$ be both moved toward the focal plane F but that the lens unit $P_1$ move more rapidly than the lens unit $N_1$. When, however, the lens $P_1$ has reached the plane L', then to further shorten the equivalent focal length it is necessary that the lens $P_1$ continue to approach the focal plane F but that the negative lens $N_1$ recede from the focal plane F until the minimum equivalent focal length has been reached. To increase the equivalent focal length the reverse procedure is followed, that is, to increase the focal length the positive lens is initially moved outwardly from the plane F while the negative lens $N_1$ is being moved toward the plane F. But when the lens $P_1$ has passed the plane L', the negative lens $N_1$ and the positive lens $P_1$ are both moved outwardly from the plane F, with the negative lens moving more slowly than the positive lens until the maximum equivalent focal length is reached.

These movements are effected by the mechanism shown in Fig. 4 so that the distance between the lens unit $N_1$ and the lens unit $P_1$ is automatically retained in correct relation with the changes occurring in the distance between the lens $P_1$ and the focal plane F. When the mounting M is slid along the slide-way $a$—$a$, the lens unit $P_1$ moved directly therewith and the axis of the lever L is displaced along the line parallel to the optical axis A—A. The lever arm $L_2$ is thereby caused to continuously pass through the axis of the sleeve $a_2$, and thereby rocks the lever arm $L_1$ which passes through the axis of the sleeve $a_3$. When the axis of the lever L passes through the plane L', the direction of movement imparted to the negative lens $N_1$ by the lever arm $L_1$ is reversed and the lens units are thereby maintained in their proper relative positions provided that the equivalent focal length of the lens $N_1$ is the same as the equivalent focal length of the lens $P_1$. When the focal length of the lens $N_1$ differs from the focal length of the lens unit $P_1$, it is necessary to adjust the axis of the sleeve $a_3$ vertically along the perpendicular to the second nodal point of the lens $N_1$ and to adjust the axis of the sleeve $a_2$ along the optical axis A—A to secure and maintain the requisite compensation for variations in the shift S.

Having described our invention, we claim—

1. A real image forming lens system including a plurality of lens units of negative focal length with a lens unit of positive focal length between them, the back focal length of the three units together being for any object distance substantially equal to the focal length of the rear negative unit multiplied by the quotient resulting from dividing the equivalent focal length of the other two units less the distance between the second nodal point of the last two lenses combined and the nodal point of the third lens, by the distance between the focal point of the first two lenses together and the focal point of the third lens alone, the equivalent focal length of the three units together being positive.

2. A lens system including a plurality of lens units of negative focal length with a lens unit of positive focal length between them, the focal length of the positive unit being substantially equal to the focal length of the negative unit adjacent thereto and the back focal length of the three units together being substantially equal to the focal length of the rear negative unit alone.

3. A lens system for photographic objectives including a plurality of lens units of negative focal length with a lens unit of positive focal length between them, the equivalent focal length of the three units together being in accordance with the formula $$E_3 = E\left(\frac{-N_2}{-\Delta_2}\right)$$

and the back focal length of the three units together being in accordance with the formula $$B_3 = -N_2\left(\frac{E-d_2}{-\Delta_2}\right)$$

in which $E_3$ represents the equivalent focal length of the three units together, E represents the equivalent focal length of the two front units, $N_2$ represents the focal length of the rear negative lens, $\Delta_2$ represents the difference between the rear focal point of the rear negative element alone and the rear focal point of the two front units together, $d_2$ represents the difference between the second nodal point of the positive element and the first nodal point of the second negative element, and $B_3$ represents the back focal length of the three elements together, and in which the term $$\frac{E-d_2}{-\Delta_2}$$

is substantially equal to 1.

4. A lens system according to claim 2, in combination with a second positive constituent, placed between the second negative constituent and the focal plane of the complete system, thereby shortening the focal length of the quadruple system as compared to that of the triple system, while maintaining a fixed back focal distance for varying object distances.

5. A lens system for photographic objectives having variable focal lengths and including three principal constituent units, two of which are adjustable mutually and respective to the third unmoving unit, simultaneous displacements of the first two members shifting the second nodal point of such combination in the direction of movement of such lenses and causing changes in the equivalent focal length of the three constituent members, and the third member maintaining constant the back focal length of the complete system.

6. A lens system for photographic objectives including two negative constituents disposed at either side of a positive constituent, the focal length of the front negative constituent being numerically equal to the focal length of the positive constituent, both of said constituents being adjustable relative to each other and relative to a fixed negative third constituent being placed at a fixed distance from said focal plane in the direction of the movable constituents, said fixed third constituent producing a focal plane for the combination of the three constituents at a constant distance from said third constituent throughout all adjustments of the first two constituents.

7. A lens system for photographic objectives including a pair of complementary lens units, one of which is of negative focal length and collects light for transmission to the system and one of which is of positive focal length, said units having an air spacing relatively to one another longer than the difference between their focal lengths and forming a positive duplex system having a back focal length varying with the distance between the units of the system, and a stationary rear lens unit of negative focal length, said rear lens unit emitting light from the system and having an air spacing from the second unit in excess of the difference between its own focal length and the equivalent focal length of the duplex system and causing a shift of the second nodal point of the triple combination contra to changes in the equivalent focal length of the triple system.

8. A lens system as set forth in claim 7 in which the stationary rear image unit has a focal length substantially equal to the equivalent focal length of the triple system divided by the equivalent focal length of the duplex system and multiplied by the optical interval between the focal points of these two systems thereby causing a shift of the second nodal point of the triple system substantially equal to changes in the equivalent focal length of the triple system.

9. In a real image forming lens system, a sequence of at least three lens units having a common optical axis and an image plane optically normal to such axis and at a substantially fixed distance from the last unit of the system for various object distances, said units forming constituents positioned along such optical axis the first constituent being of negative focal length and the second constituent being of positive focal length, said first and second constituents having an air space between them longer than the difference between their focal lengths and coacting as a duplex converging system, and the distance between (a) the second focal point of the duplex system, and (b) the second focal point of the last constituent, substantially equals the difference between (c) the focal length of the duplex system, and (d) the distance between the middle and last constituents, such last named distance being measured from the second nodal point of the second constituent to the first nodal point of the last constituent.

10. In a photographic apparatus having means for positioning film in a fixed plane, a real image forming lens system comprising means forming an objective having a fixed position relative to said plane for various object distances, a movable lens unit of positive focal length air spaced in front of said means last named, and a movable lens unit of negative focal length air spaced in front of said first named movable unit, said movable lens units being air spaced distances in excess of the differences between their focal lengths and forming a duplex system having a variable back focal length varying with the variations in the distance between its units, and said stationary objective-forming means having a focal length causing a shift of the second nodal point of the complete system contra in direction to changes in the equivalent focal length of the complete system and substantially equal thereto.

11. A real image forming lens system composed of a sequence of at least three lens units having a common optical axis and an image plane at a substantially fixed distance from the last unit of the system for various object distances, said sequence including a front lens unit of negative focal length, an intermediate lens unit of positive focal length and air spaced from the front unit a distance greater than the difference between the focal lengths of said units and forming a duplex system having equivalent conjugate image distances increasing with diminution of object distances and conjugate equivalent focal length and back focal distances which increase by increments changing functionally with the decrease in object distances, and said sequence including a rear lens unit optically aligned with and air spaced from said duplex system, said rear unit having a focal length equal to the equivalent focal length of the triple system divided by the equivalent focal length of the duplex system and multiplied by the optical interval between the two systems and positioned relatively to the duplex system a distance equal to the equivalent focal length of the duplex system divided by the equivalent focal length of the triple system and multiplied by the focal length of the rear element so that the distances between the second nodal point of the rear unit and the focal planes of the complete system conjugate to objects at various distances in front of the system are augmented by increments substantially equal to the first named increments caused by decreases in object distances.

LODEWYK J. R. HOLST.
WILLIAM MAYER.
HARRY R. MENEFEE.